UNITED STATES PATENT OFFICE.

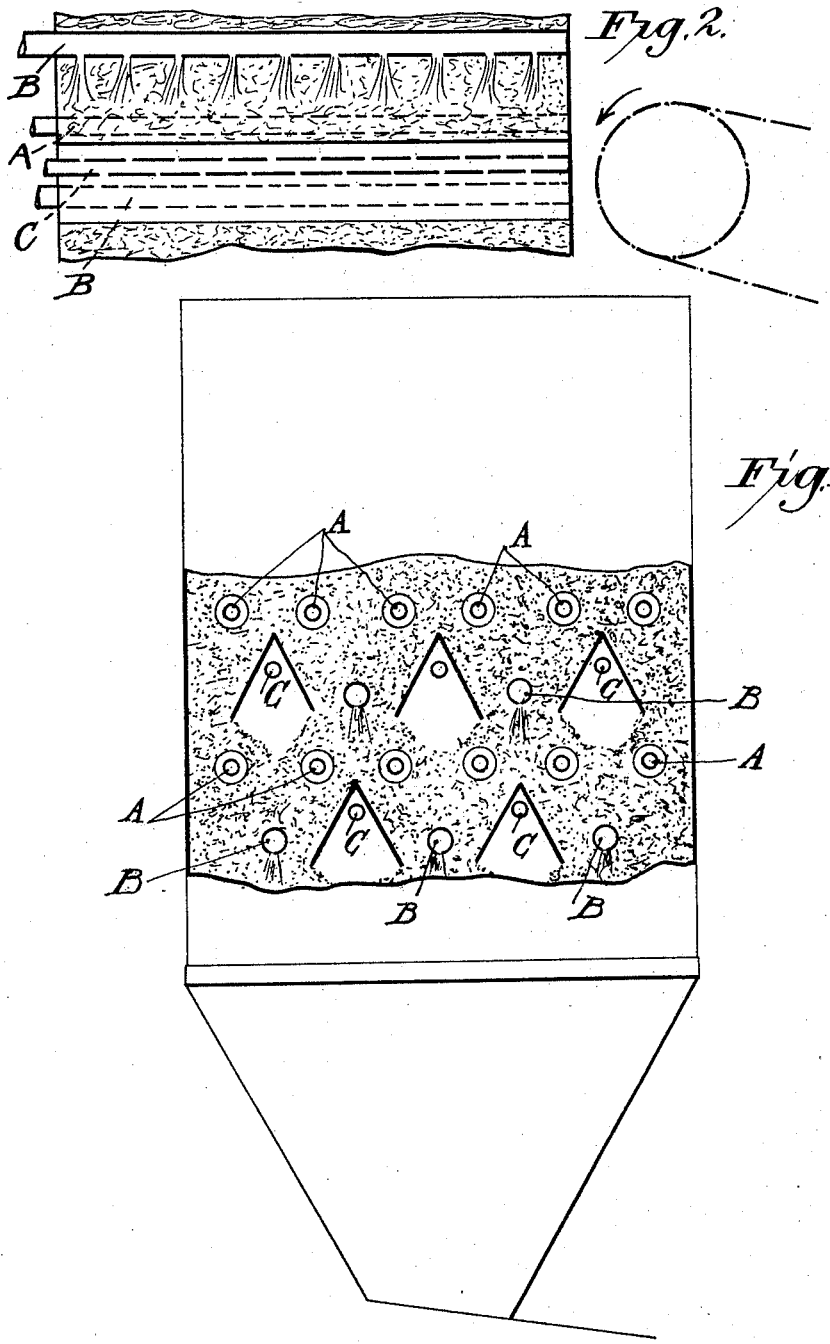

ANDRÉ PAUL EDOUARD BOURDET, OF PARIS, FRANCE.

APPARATUS WITH SEVERAL TUBES FOR TREATING PULVERULENT MATERIALS.

1,394,269.   Specification of Letters Patent.   Patented Oct. 18, 1921.

Application filed January 10, 1920. Serial No. 350,715.

*To all whom it may concern:*

Be it known that I, ANDRÉ PAUL EDOUARD BOURDET, residing in Paris, France, have invented new and useful Improvements in or Relating to Apparatus with Several Tubes for Treating Pulverulent Materials (for which I have filed an application in France, No. 106,921, Dec. 24, 1918), of which the following is a specification.

The apparatus in conformity with the invention is adapted to work either continuously or not in baking, drying, cooling, mixing and distilling pulverulent materials: It comprises three bundles of tubes A, B, C, shown on the annexed drawings and passing through the walls, entirely or partially tightly, of the casing containing the materials to be treated.

In the accompanying drawings:—

Figure 1 is partly an elevation and partly a sectional view of an apparatus constructed in accordance with my invention.

Fig. 2 is a detail sectional view of the same, taken on a plane at right angles to that of Fig. 1.

The thermic bundle A is provided or not with wings and contacts with the materials to be treated in the casing. The blowing bundle B has apertures through which gases, vapors or liquids admitted under pressure continuously or not are introduced into the treated materials.

The sucking bundle C has apertures through which gases, vapors or liquids are extracted continuously or intermittently from the treated material.

The supplying and expelling devices allow a continuous or intermittent working with the partial or total tightness and control of the speed of the material to be treated.

The materials forming the different parts of the apparatus are provided with suitable lining. The disposition of an element of each bundle can be modified according to the results to be obtained.

If the invention is applied to drying and recuperating operations using the condensing latent heat of steam, the bundles A, B, C, are approximately horizontal and parallel.

Each tube of the bundle C (sucking bundle) is located in a reversed gutter forming a screen and producing in the treated material a free space.

The casing of the drying apparatus is preferably parallelepipedic.

The circulation of the material to be treated is vertical and takes place downward by gravity.

The thermic bundle A can be fed by steam supplied either by a simple connection with an ordinary boiler or by double connection with a boiler of the type used for domestic heating, the thermic bundle being supplied in that case in closed circuit.

This latter kind of supply allows a complete recuperation of heat, and brings under the hearth of the boiler gases and vapors coming from the sucking apparatus.

I claim:

1. Apparatus for treating pulverulent materials comprising blowing tubes and sucking tubes in spaced relation, and angular screens between said blowing tubes and said sucking tubes and in the angles of which said sucking tubes are located.

2. Apparatus for treating pulverulent materials comprising thermic tubes, blowing tubes and sucking tubes in spaced relation, and screens between said blowing tubes and said sucking tubes.

In testimony whereof I affix my signature.

ANDRÉ PAUL EDOUARD BOURDET.